US010889766B2

(12) United States Patent
Barreau et al.

(10) Patent No.: US 10,889,766 B2
(45) Date of Patent: Jan. 12, 2021

(54) PETROLEUM DEMULSIFIER

(71) Applicant: OLEON NV, Evergem (BE)

(72) Inventors: Sébastien Barreau, Noyon (FR); Dirk Packet, Rotselaar (BE); Pauline Couleon, Conflans Sainte Honorine (FR); Marine Fouquet, La Varenne Saint Hilaire (FR)

(73) Assignee: OLEON NV, Evergem (BE)

( * ) Notice: Subject to any disclaimer, the term of this patent is extended or adjusted under 35 U.S.C. 154(b) by 102 days.

(21) Appl. No.: 16/085,905

(22) PCT Filed: Mar. 15, 2017

(86) PCT No.: PCT/EP2017/056166
§ 371 (c)(1),
(2) Date: Sep. 17, 2018

(87) PCT Pub. No.: WO2017/158054
PCT Pub. Date: Sep. 21, 2017

(65) Prior Publication Data
US 2019/0093024 A1    Mar. 28, 2019

(30) Foreign Application Priority Data
Mar. 18, 2016  (FR) ..................... 16 52359

(51) Int. Cl.
*C10G 33/04* (2006.01)
*B01D 17/04* (2006.01)
*C10L 1/18* (2006.01)

(52) U.S. Cl.
CPC ........... *C10G 33/04* (2013.01); *B01D 17/047* (2013.01); *C10L 1/1802* (2013.01)

(58) Field of Classification Search
None
See application file for complete search history.

(56) References Cited

U.S. PATENT DOCUMENTS

| | | | | |
|---|---|---|---|---|
| 4,663,039 A | * | 5/1987 | Lindorfer | B01D 17/047 210/241 |
| 5,104,418 A | * | 4/1992 | Genova | C10L 1/328 44/301 |
| 5,654,192 A | * | 8/1997 | Ducreux | B09C 1/02 435/262 |
| 2004/0111955 A1 | * | 6/2004 | Mullay | C10L 10/02 44/301 |
| 2006/0236594 A1 | * | 10/2006 | Lynn | C09K 3/32 44/280 |
| 2006/0281931 A1 | | 12/2006 | Leinweber et al. | |
| 2011/0277376 A1 | * | 11/2011 | Bloom | C10L 1/188 44/403 |

FOREIGN PATENT DOCUMENTS

| | | | |
|---|---|---|---|
| JP | 2011168527 A | * | 9/2011 |
| JP | 2011225453 A | * | 11/2011 |
| WO | WO 2012/177836 A1 | | 12/2012 |
| WO | WO 2015/174870 A1 | | 11/2015 |

OTHER PUBLICATIONS

Madihalli et al. "Mannosylerythritol Lipid-A as a Pour Point Depressant for Enhancing the Low-Temperature Fluidity of Biodiesel and Hydrocarbon Fuels", Energy Fuels, 2016, 30, 4118-4125. (Year: 2016).*

Masaaki Konishi, et als., "Efficient production of mannosylerythritol lipids with high hydrophilicity by Pseudozyma hubeiensis KM-59," Applied Microbiology and Biotechnology, Springer, Berlin, DE, vol. 78, No. 1, 2008, pp. 37-46.

Mazaheri Assadi, et als., "Biosufactants and their Use in Upgrading Petroleum Vacuum Distillation Residue: A Review," Int. J. Environ, Res.,Tehran, Iran, Dec. 31, 2010, pp. 549-572, Autumn 2010.

Rita Silva, et als., "Applications of Biosurfactants in the Petroleum Industry and the Remediation of Oil Spills," International Journal of Molecular Sciences, Brazil, Jul. 15, 2014, vol. 15, No. 7, pp. 12523-12542.

International Search Report for PCT/EP2017/056166 dated May 23, 2017.

Fukuoka, T., et al., "Enzymatic synthesis of a novel glycolipid biosurfactant, mannosylerythritol lipid-D and its aqueous phase behavior," Carbohydrate Research, Nov. 26, 2011, vol. 346, pp. 266-271.

Rau, Udo, et al., "Downstream processing of mannosylerythritol lipids produced by Pseudozyma aphidis," Eur. J. Lipid Sci. Technol. 107 (2005) 373-380.

* cited by examiner

*Primary Examiner* — Nicole M. Buie-Hatcher
(74) *Attorney, Agent, or Firm* — Arent Fox LLP

(57) ABSTRACT

The invention relates to a composition containing petroleum, water and a demulsifier, and in particular to a method for demulsifying emulsions composed of petroleum and water.

7 Claims, No Drawings

PETROLEUM DEMULSIFIER

CROSS REFERENCE TO RELATED APPLICATIONS

This application is a 35 U.S.C. 371 National Phase of PCT Application No. PCT/EP2017/056166 filed Mar. 15, 2017, which claims benefit to FR Application No. 1652359 filed Mar. 18, 2016, the disclosure of which is hereby incorporated by reference in its entirety.

The present invention relates to a composition comprising petroleum, water and a demulsifier, and in particular to a process for the demulsification of petroleum and water emulsions.

An emulsion is a suspension of a liquid in the form of particles or droplets in another liquid, these two liquids being non-miscible with each other. The two non-miscible liquids of an emulsion are generally denoted by "aqueous phase" and "oil phase".

The invention relates in particular to emulsions of petroleum (oil phase) and water (aqueous phase). Such emulsions can form when water and petroleum, that have come into contact, are subjected to forces, such as shearing forces. By way of example, outside a wellbore, such emulsions are created at wellheads, in valves, in pumps, or in production tubing.

For economic reasons and reasons relating to corrosion problems, petroleum must be free of water before any transport or conversion.

An effective solution for separating the oil phase from an aqueous phase of an emulsion, is to use a demulsifier.

A demulsifier is a compound or a mixture of compounds, promoting demulsification.

Demulsification, also called emulsion breaking, is the separation of the oil phase and the aqueous phase.

Several demulsifiers have been described. However, most of them have a certain toxicity, whether for humans and/or the environment, and/or a significant ecological impact.

With a worldwide daily production of more than 80 million barrels of petroleum, this means that each day there are millions of litres of petroleum to demulsify.

Now, the utilization of a demulsifier in the context of the treatment of petroleum before refining, suggests:
  on the one hand, the use of a significant quantity of demulsifier, and
  on the other hand, the treatment of water that has come into contact with the latter.

As a result, in order to limit the impact on the environment, it would be advantageous to have available a bio-degradable and bio-renewable demulsifier, and in order to limit the risks of pollution and the costs associated with a potential water treatment, it would be advantageous to have available demulsifiers that are slightly toxic or non-toxic.

Application US20060281931 describes the use of cross-linked alkoxylated polyglycerols as bio-degradable demulsifiers. However, the alkoxylated parts, obtained from C2-C4 alkylene oxides are not of renewable origin.

Application WO2012177836 describes the use of polyorganosiloxanes as biodegradable demulsifiers of petroleum emulsion. However, their biodegradability remains limited, 18% in 28 days for the example given, and this type of compounds is not produced from renewable resources.

A need therefore still exists for a demulsifier of petroleum and water emulsions, which is bio-degradable, bio-renewable and has little or no toxicity.

Moreover, as the contents of constituents (saturated, aromatics, resins, asphaltenes) of the petroleums are variable depending on the geographical origin, and as the emulsions are able to contain more or less water, it is desirable that the demulsifier is effective vis-à-vis a large group of emulsions. For economic reasons, it is also desirable that the demulsifier is effective in low quantities.

The work of the inventors has made it possible to demonstrate that the addition of a particular compound to a petroleum and water emulsion makes it possible to demulsify this emulsion.

The invention therefore relates to a composition comprising petroleum, water and at least one mannosylerythritol lipid.

In fact, the addition of a mannosylerythritol lipid to a petroleum and water emulsion makes it possible to break this emulsion.

By "petroleum", is meant a mixture of hydrocarbons, also containing sulphur-containing, oxygen-containing and/or nitrogen-containing organic compounds. It can be both crude petroleum, i.e. originating directly from a field, or a synthetic petroleum, i.e. a petroleum reconstituted from hydrocarbon fractions and/or compounds obtained by a synthesis process (and not by distillation or by extraction), or mixtures thereof, such as, for example, a crude petroleum diluted with another crude petroleum or a crude petroleum diluted with a synthetic petroleum.

By "water", is meant any type of water, such as demineralized water or water containing salts, such as seawater or brine. Preferably, the water contains salts.

By "mannosylerythritol lipid" or MEL, is meant a surfactant comprising a hydrophilic part formed by the mannosylerythritol group, and a hydrophobic part formed by at least one acyl group.

More particularly, by "MEL", is meant a molecule having the following general formula (I):

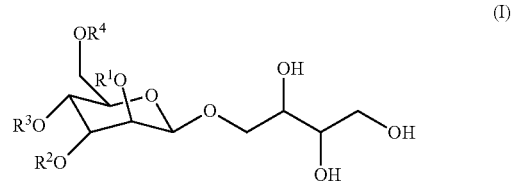

in which:
$R^1$ and $R^2$, identical or different, represent an acyl group comprising an unsaturated or saturated acyclic carbon-containing chain, and
$R^3$ and $R^4$, identical or different, represent an acetyl group or a hydrogen atom.

Preferably, the carbon-containing chain of the acyl group is linear. In particular, the carbon-containing chain comprises only carbon and hydrogen atoms, optionally substituted by a hydroxyl (OH) function.

Two stereoisomers of the MEL of formula (I) are known and represented in formulae (II) and (III) hereafter:

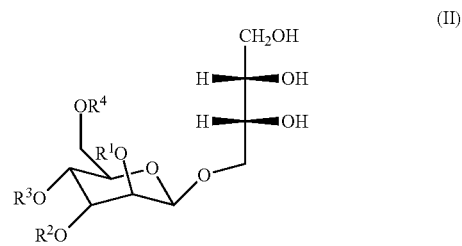

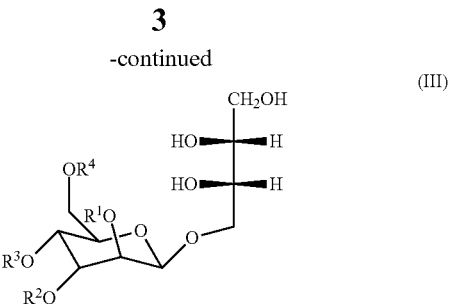

(III)

in which, $R^1$, $R^2$, $R^3$ and $R^4$ are identical to those indicated in formula (I).

Advantageously, in the present invention, a MEL is a molecule of formula (II).

Formulae (I), (II) and (III) above can represent several molecules, each molecule therefore being a MEL. By "MELs", is meant at least two molecules of formulae (I) different by virtue of their substitution (acyl, acetyl and/or hydroxyl groups) or by their stereoisomerism, more particularly, at least two different molecules of formulae (II).

The MELs are generally classified in four classes of molecules, denoted A to D, according to their degree of acetylation in positions $R^3$ and $R^4$. The class of the MELs-A comprises the molecules of formula (I), more particularly of formula (II) and/or (III) having two acetyl groups in positions $R^3$ and $R^4$. The class of the MELs-B and the class of the MELs-C comprise the molecules of formula (I), more particularly of formula (II) and/or (III) having a single acetyl group in positions $R^4$ and $R^3$ respectively. Finally, the class of the MELs-D comprises the molecules of formula (I), more particularly of formula (II) and/or (III) not having an acetyl group ($R^3=R^4=H$).

As well as by their degree of acetylation, the MELs can vary in their structure, by the nature of the acyl groups which compose their hydrophobic part. This variation is generally a function of the process implemented for obtaining the MELs The acyl groups in positions $R^1$ and $R^2$ preferably comprise a carbon-containing chain comprising from 8 to 24 carbon atoms. More preferably, the acyl groups in positions $R^1$ and $R^2$ are saturated and comprise a carbon-containing chain comprising from 8 to 16 carbon atoms.

It will be noted that in the context of the present application, and unless stated otherwise, the value ranges indicated are inclusive.

The MELs are generally obtained by a fermentation process, i.e. a conversion of a carbon-containing substrate by a microorganism, such as a bacterium, or a yeast strain.

The strains from which it is possible to obtain MELs are well known to a person skilled in the art. By way of example, it is known to use strains of the family of the Basidiomycetes, preferably of the genus *Pseudozyma*, such as *Pseudozyma antarctica*, *Pseudozyma aphidis*, *Pseudozyma rugulosa*, *Pseudozyma parantarctica*, *Pseudozyma graminicola*, *Pseudozyma siamensis*, *Pseudozyma hubeiensis*, *Pseudozyma tsukubaensis*, *Pseudozyma crassa*, or of the genus *Ustilago*, such as *Ustilago maydis*, *Ustilago cynodontis* and *Ustilago scitaminea*.

In general, depending on the strain, a class of MEL, MEL(s)-A, MEL(s)-B, MEL(s)-C or MEL(s)-D, is mainly or even exclusively produced relative to the other classes of MEL. By way of example, *Pseudozyma antarctica*, *Pseudozyma aphidis*, *Pseudozyma rugulosa* and *Pseudozyma parantarctica* produce in the majority the MELs-A of formula (II). *Pseudozyma graminicola*, *Pseudozyma siamensis*, *Pseudozyma hubeiensis* produce mainly MELs-C of formula (II). *Pseudozyma tsukubaensis* produces MELs-B of formula (III) and *Pseudozyma crassa* produces mainly MELs-A of formula (III).

Advantageously, the MELs to which the present application relates are obtained by a fermentation process utilizing a strain producing the MELs of formula (II).

More particularly, the MELs utilized in the present application are obtained by a fermentation process utilizing a strain selected from *Pseudozyma aphidis*, *Pseudozyma rugulosa* or *Pseudozyma antarctica*, preferentially from *Pseudozyma aphidis* or *Pseudozyma antarctica*, more preferentially, the strain is *Pseudozyma aphidis*.

The carbon-containing substrate is typically a glycerol, an n-alkane or an oil, in particular of renewable origin.

Any oil, composed of triglycerides and liquid at the temperature of the fermentation process, can be used as carbon-containing substrate.

Preferentially, the renewable oil is a vegetable or animal oil, more preferentially, a vegetable oil. In particular, the vegetable oil is selected from the group constituted by a soya oil, a sunflower oil, an olive oil and a rapeseed oil. More particularly, the vegetable oil is a soya oil or a rapeseed oil, even more particularly, a rapeseed oil.

These renewable oils are particularly rich in acyl groups comprising a carbon-containing chain with 18 carbon atoms, such as commonly called, oleic, linoleic and/or linolenic acid, as well as, to a lesser degree, in acyl groups comprising a carbon-containing chain with 16 carbon atoms, such as commonly called palmitic acid.

The fermentation process generally lasts at least 3 days, preferentially at least 7 days.

According to a preferential embodiment, the MELs are obtained by a fermentation process utilizing:
 a strain of the genus *Pseudozyma*, preferentially *Pseudozyma antartica* or *Pseudozyma aphidis*,
 a vegetable oil, preferentially a rapeseed oil or a soya oil, as carbon-containing substrate.

Such a strain is usually cultured in a reactor in a medium comprising glucose, water and/or salts (such as magnesium sulphate, monopotassium phosphate, sodium nitrate and/or ammonium nitrate). This culture medium is also utilized in the fermentation process. In fact, in general, the fermentation medium of the fermentation process comprises a culture medium and the carbon-containing substrate.

Advantageously, the different components of the medium (glucose and strain in particular) are sterilized separately before introduction into the reactor.

The temperature of the medium is preferably comprised between 20° C. and 35° C., more preferentially between 25° C. and 30° C.

The MEL(s) thus obtained from a raw material of renewable origin, such as a vegetable or animal oil, preferably a vegetable oil, is/are bio-renewable.

Such MEL(s) are also slightly toxic and biodegradable.

The crude reaction medium obtained at the end of the fermentation process, is what is called the crude fermentation medium in the present application.

The crude fermentation medium generally comprises at least one MEL, at least residual carbon-containing substrate and/or a by-product of the carbon-containing substrate, the strain and water, the by-product of the carbon-containing substrate resulting from the fermentation.

The separation of the MEL(s) subsequent to the fermentation process, has the objective of separating the MEL(s) from one or more other components of the crude fermentation medium.

According to the preferential embodiment above, the crude fermentation medium comprises at least one MEL, at least one triglyceride and/or at least one fatty acid, water and a strain of the genus *Pseudozyma*.

The separation of the MEL(s) from one or more other components of the crude fermentation medium can be done by any separation method known to a person skilled in the art.

Advantageously, the separation of the MEL(s) from one or more of the other components can comprise one or more of the following methods:
settling,
centrifugation,
filtration,
evaporation,
liquid/liquid extraction,
passing over a mineral substrate or a resin In particular, the strain can be separated by settling, filtration, and/or centrifugation; the water can be separated by settling, evaporation, centrifugation, and/or passing over a mineral substrate which is an adsorbent; the fatty acids and the triglycerides can be separated by liquid/liquid extraction and/or by passing over a mineral substrate or a resin.

The composition according to the invention therefore comprises a petroleum, water and at least one MEL.

Advantageously, the quantity of petroleum present in the composition according to the invention is comprised between 15% and 80% by volume with respect to the volume of the composition.

Preferably, the quantity of petroleum present in the composition according to the invention is comprised between 20% and 70%, more preferentially between 30% and 60%, even more preferentially between 40% and 60% by volume, with respect to the volume of the composition.

Preferably, the petroleum has a dynamic viscosity at 90° C. at atmospheric pressure of less than 200 mPa·s, more preferentially less than 150 mPa·s.

Advantageously, the petroleum has a dynamic viscosity at 20° C. at atmospheric pressure of less than 200 mPa·s, more preferentially less than 150 mPa·s, and/or a content of paraffins of less than 70% by weight, more preferentially less than 65% by weight with respect to the weight of the petroleum.

Advantageously, the total quantity of MEL(s) present in the composition according to the invention is comprised between 0.5 ppm and 100 ppm, with respect to the weight of the composition.

By "total quantity of MEL(s) present in the composition", is meant the quantity of molecules of MEL(s) of formula (I), more particularly, of formula (II) and/or (III), present in said composition.

Preferably, the total quantity of MEL(s) is comprised between 2 ppm and 80 ppm, more preferentially between 3 ppm and 60 ppm, even more preferentially between 5 ppm and 50 ppm, with respect to the weight of the composition.

Advantageously, the composition according to the invention comprises at least two MELs, of different classes, selected from the group constituted by the MELs-A, the MELs-B, the MELs-C and the MELs-D.

According to a first advantageous embodiment of the composition according to the invention, the composition comprises MEL(s)-A, MEL(s)-B, MEL(s)-C and optionally MEL(s)-D, more preferentially MEL(s)-A, MEL(s)-B, MEL(s)-C and MEL(s)-D.

More preferentially, the composition according to the invention comprises the MEL(s)-A and MEL(s)-B at a content comprised between 50% to 95% by weight, preferably 60% to 85% by weight, the percentages by weight being indicated with respect to the weight of the total quantity of MELs.

Preferably, the composition according to the invention comprises MEL(s)-C at a content greater than or equal to 5% by weight, preferentially greater than 10% by weight, the percentages by weight being indicated with respect to the weight of the total quantity of MELs.

More particularly, the composition according to the invention comprises MEL(s)-A and MEL(s)-B at a content comprised between 60% and 80% by weight and MEL(s)-C at a content greater than or equal to 20% by weight, the percentages by weight being indicated with respect to the weight of the total quantity of MELs.

According to a second advantageous embodiment of the composition according to the invention, the composition comprises MEL(s)-D at a content comprised between 75% and 100% by weight, preferably between 90% and 100% by weight, the percentages by weight being indicated with respect to the weight of the total quantity of MELs.

The MEL(s)-D can be obtained by deacetylation of the MEL(s)-A, MEL(s)-B and MEL(s)-C. An example of a deacetylation reaction of the MEL(s)-A, MEL(s)-B and MEL(s)-C using a hydrolyzing enzyme is described in the following publication: "Enzymatic synthesis of a novel glycolipid biosurfactant, mannosylerythritol lipid-D and its aqueous phase behavior"; Fukuoka et al.; Carbohydrate Research (2011), 346, 266-271.

The composition according to the invention can moreover comprise:
residual carbon-containing substrate and/or a by-product of the carbon-containing substrate, and
optionally, a strain.

When the carbon-containing substrate is an oil of renewable origin, a by-product of the carbon-containing substrate is a fatty acid. In fact, a vegetable oil is mainly (more than 90% by weight) constituted by triglycerides. The residual vegetable oil is therefore composed of at least one triglyceride.

In this case, the composition according to the invention further comprises:
at least one triglyceride and/or at least one fatty acid, and optionally, a strain.

By "fatty acid", is meant a fatty acid that is free and/or in the form of a salt.

The quantity of fatty acid(s) and/or of triglyceride(s) present in the composition according to the invention can be comprised between $1.10^{-7}$ ppm and 80 ppm, preferably between $1.10^{-4}$ ppm and 60 ppm, with respect to the weight of the composition.

More particularly, the composition according to the invention comprises at least one triglyceride and at least one fatty acid.

In this case, the quantity of fatty acid(s) and of triglyceride(s) present in the composition according to the invention can be comprised between $1.10^{-6}$ ppm and 100 ppm, preferably between $1.10^{-3}$ ppm and 80 ppm, more preferentially, between $5.10^{-3}$ ppm and 60 ppm, even more preferentially, between $1.10^{-2}$ ppm and 50 ppm, with respect to the weight of the composition.

Advantageously, the fatty acid(s) comprise(s) a carbon-containing chain comprising between 8 and 24 carbon atoms, preferably between 8 and 20 carbon atoms.

Advantageously, the triglyceride(s) comprise(s) acyl groups the saturated or unsaturated, acyclic carbon-containing chain of which comprises between 8 and 24 carbon atoms, preferably between 16 and 18 carbon atoms. More particularly, the carbon-containing chain is linear and only comprises carbon and hydrogen atoms, optionally substituted by a hydroxyl (OH) function.

The MEL(s) can therefore be used in a more or less purified form, i.e. in a mixture with other components of the fermentation medium. The MELs can thus be introduced into the composition according to the invention with its fermentation medium, in other words, in the form of the crude fermentation medium.

More particularly, in the present application, and in particular in the examples, when the MEL(s), is/are in a mixture with at least one fatty acid and/or at least one triglyceride, optionally water and/or a strain, this mixture is called "mixture of MEL(s)".

A particularly preferred composition according to the invention comprises a petroleum, water and a mixture of MEL(s).

A first preferred mixture of MEL(s) is a crude fermentation medium, i.e. at least one MEL with its fermentation medium.

The crude fermentation medium can be subjected to one or more separation methods, leading to other preferred mixtures of MEL(s) having the following features:
- a content of MEL(s) greater than or equal to 30% by weight, preferentially greater than or equal to 40% by weight, more preferentially greater than or equal to 50% by weight;
- a content of other components (including fatty acid(s), triglyceride(s), water and/or strain) less than or equal to 70% by weight, preferentially less than or equal to 60% by weight, more preferentially less than or equal to 50% by weight;

the percentages by weight being given with respect to the weight of the mixture of MEL(s).

More particularly, depending on the separation method(s), mixtures of MEL(s) which are more or less concentrated in MEL(s) can be obtained.

According to a first embodiment, the mixture of MEL(s) has the following features:
- a content of MEL(s) greater than or equal to 55% by weight;
- a content of other components (including fatty acid(s), triglyceride(s), water and/or strain) less than or equal to 45% by weight;

the percentages by weight being given with respect to the weight of the mixture of MEL(s).

Advantageously, in this first embodiment, the content of water and/or of strain is less than or equal to 10% by weight, preferentially less than or equal to 5% by weight, with respect to the weight of the mixture of MEL(s).

A mixture of MEL(s), and more particularly a mixture of MELs (comprising at least 2 MELs), can be obtained by a fermentation process described above, followed by one or more separation stage(s), such as filtration, centrifugation, evaporation, and/or liquid/liquid extraction.

According to a second embodiment, the mixture of MEL(s) has the following features:
- a content of MEL(s) greater than or equal to 90% by weight, preferentially greater than or equal to 95% by weight, more preferentially greater than or equal to 98% by weight;
- a content of other components (including fatty acid(s), triglyceride(s), water and/or strain) less than or equal to 10% by weight, preferentially less than or equal to 5% by weight, more preferentially less than or equal to 2% by weight;

the percentages by weight being given with respect to the weight of the mixture of MEL(s).

Advantageously, in this second embodiment, the content of water and/or of strain is less than or equal to 2% by weight, with respect to the weight of the mixture of MEL(s).

In fact, it is also possible to obtain a mixture of MEL(s) having a content of MEL(s) greater than or equal to 90% by weight, preferably with respect to the total weight of the mixture of MEL(s). This mixture of MEL(s), and more particularly a mixture of MELs (comprising at least 2 MELs) can, for example, be obtained using a fermentation process described above to which one or more additional separation method(s) is/are added. Examples of suitable separation methods are a liquid/liquid extraction and passing over a mineral substrate. Passing over a mineral substrate can be a chromatography, such as an adsorption chromatography on a silica column, carried out using suitable solvents. Such solvents are known to a person skilled in the art.

Preferably, the mixtures of MELs, whatever the embodiment, comprise MELs of different classes, in general at least MEL(s)-A, MEL(s)-B and MEL(s)-C. Preferentially, these mixtures of MELs comprise MEL(s)-A, MEL(s)-B, MEL(s)-C and MEL(s)-D.

Moreover, the mixtures of MELs advantageously comprise MEL(s)-A and MEL(s)-B at a content comprised between 50 and 95% by weight, preferably comprised between 60 and 85% by weight, the percentages by weight being indicated with respect to the weight of the total quantity of MELs.

In addition, the mixtures of MELs advantageously comprise MEL(s)-C at a content greater than or equal to 5% by weight, preferably greater than or equal to 10% by weight, the percentages by weight being indicated with respect to the weight of the total quantity of MELs.

More particularly, a mixture of MELs can comprise MELs-A and MELs-B at a content comprised between 60% and 75% by weight, and MELs-C at a content greater than or equal to 20% by weight, the percentages by weight being indicated with respect to the weight of the total quantity of MELs.

Such mixtures of MELs are for example obtained using a fermentation process as those described above.

Examples of mixtures of MELs and of the process for obtaining them are also described in the following publication: "Downstream processing of mannosylerythritol lipids produced by *Pseudozyma aphidis*"; Rau et al.; European Journal of Lipids Science and Technology (2005), 107, 373-380.

In the mixtures of MEL(s), whatever the embodiment, the MEL(s)-A, MEL(s)-B and/or MEL(s)-C can be deacetylated. The mixtures of MEL(s) then comprise MEL(s)-D at a content comprised between 75% and 100% by weight, preferably between 90% and 100% by weight, the percentages by weight being indicated with respect to the weight of the total quantity of MEL(s).

Advantageously, the composition according to the invention further comprises a surfactant other than a MEL.

Preferably, the surfactant is selected from the surfactants used as demulsifiers of water and petroleum emulsions.

Preferably, the surfactant has a hydrophilic-lipophilic balance (HLB) greater than 6, more preferentially greater than 8.

By "HLB (Hydrophilic-Lipophilic Balance)" is meant the balance between the dimension and the force of the hydrophilic group and the dimension and the force of the lipophilic group of the surfactant. The HLB value according to GRIFFIN is defined in J. Soc. Cosm. Chem. 1954 (volume 5), pages 249-256.

Preferably, the surfactant is selected from the group constituted by the polymers and copolymers of ethylene oxide and/or of propylene oxide; the polyglycerol esters; the sorbitan esters; the amines, such as hexylamine or octylamine; the alkoxylated compounds such as the ethoxylated phenols, the ethoxylated alcohols, the alkoxylated sorbitan esters, and the ethoxylated amines; and mixtures thereof.

More preferentially, the surfactant is selected from the group constituted by the alkoxylated compounds such as the ethoxylated phenols, the ethoxylated alcohols, the alkoxylated sorbitan esters, and the ethoxylated amines; the polyglycerol esters; and mixtures thereof.

Alternatively, the surfactant is selected from the polymers and copolymers of ethylene oxide and/or of propylene oxide.

The invention also relates to a process for the demulsification of a water and petroleum emulsion, comprising bringing a demulsifier into contact with the emulsion, the demulsifier comprising at least one MEL.

The at least one MEL is as described above and can be obtained by the fermentation processes described above.

Advantageously, the demulsifier comprises at least two MELs, of different classes, selected from the group constituted by the MELs-A, the MELs-B, the MELs-C and the MELs-D.

According to a first advantageous embodiment of the process according to the invention, the demulsifier comprises MEL(s)-A, MEL(s)-B, MEL(s)-C and optionally MEL(s)-D, more preferentially MEL(s)-A, MEL(s)-B, MEL(s)-C and MEL(s)-D.

Preferably, the demulsifier comprises MEL(s)-A and MEL(s)-B at a content comprised between 50% and 90% by weight, preferably between 60% and 85% by weight, the percentages by weight being indicated with respect to the weight of the total quantity of MELs.

Preferably, the demulsifier comprises MEL(s)-C at a content greater than 5% by weight, preferentially greater than 10% by weight, the percentages by weight being indicated with respect to the weight of the total quantity of MELs.

More particularly, the demulsifier comprises MEL(s)-A and MEL(s)-B at a content comprised between 60% and 80% by weight and MEL(s)-C at a content greater than or equal to 20% by weight, the percentages by weight being indicated with respect to the weight of the total quantity of MELs.

According to a second advantageous embodiment of the process, the demulsifier comprises MEL(s)-D at a content comprised between 75% and 100% by weight, preferably between 90% and 100% by weight, the percentages by weight being indicated with respect to the weight of the total quantity of MELs.

The MEL(s) has/have the effect of separating and/or of accelerating the separation of water and petroleum emulsions. As illustrated in Examples 2 b)-d), the effect of the addition of a MEL is visible after settling of the emulsion for 1 hour at ambient temperature, i.e. at 25° C., plus or minus 5° C., at atmospheric pressure. This effect can be improved at higher temperatures. In the case of water-in-petroleum emulsions, the more acidic the pH, the more the demulsification is improved.

Preferably, in the demulsification process according to the invention, the quantity of petroleum is comprised between 15 and 80% by volume with respect to the volume of the emulsion.

More preferentially, the quantity of petroleum is comprised between 20% and 70%, even more preferentially between 30% and 60%, more particularly between 40% and 60% by volume, with respect to the volume of the emulsion.

Preferably, in the demulsification process according to the invention, the total quantity of mannosylerythritol lipid(s) is comprised between 0.5 ppm and 100 ppm, with respect to the weight of the emulsion.

By "total quantity of MEL(s) present in the emulsion", is meant the quantity of molecules of MEL(s) of formula (I), more particularly, of formula (II) and/or (III), present in said emulsion.

More preferentially, the total quantity of MEL(s) is comprised between 2 ppm and 80 ppm, even more preferentially between 3 ppm and 60 ppm, more particularly between 5 ppm and 50 ppm, with respect to the weight of the emulsion.

Advantageously, the demulsifier of the demulsification process according to the invention further comprises at least one triglyceride and/or at least one fatty acid.

The quantity of fatty acid(s) and/or of triglyceride(s) present in the emulsion can be comprised between $1.10^{-7}$ ppm and 80 ppm, preferably between $1.10^{-4}$ ppm and 60 ppm, with respect to the weight of the emulsion.

More particularly, the demulsifier of the demulsification process according to the invention further comprises at least one triglyceride and at least one fatty acid.

In this case, the quantity of fatty acid(s) and of triglyceride(s) present in the emulsion can be comprised between $1.10^{-6}$ ppm and 100 ppm, preferably between $1.10^{-3}$ ppm and 80 ppm, more preferentially between $5.10^{-3}$ ppm and 60 ppm, even more preferentially between $1.10^{-2}$ ppm and 50 ppm, with respect to the weight of the emulsion.

Advantageously, the fatty acid(s) comprise(s) a carbon-containing chain comprising between 8 and 24 carbon atoms, preferably between 8 and 20 carbon atoms.

Advantageously, the triglyceride(s) comprise(s) acyl groups the acyclic carbon-containing chain of which comprises between 8 and 24 carbon atoms, preferably between 16 and 18 carbon atoms.

According to a particular embodiment of the demulsification process according to the invention, the demulsifier comprises a mixture of MEL(s).

The mixture of MEL(s) is as described above.

The at least one triglyceride and/or the at least one fatty acid can be introduced concomitantly with the at least one MEL.

Advantageously, the fatty acid(s) and/or triglyceride(s) can originate from the renewable oil utilized during a fermentation process described above.

In order to facilitate the handling of the MEL, the MEL or the MELs or the mixture of MEL(s) can be dispersed in water and/or in an organic solvent before being brought into contact with the emulsion.

Preferably, in the demulsification process according to the invention, the demulsifier further comprises a surfactant other than the mannosylerythritol lipid.

Generally, a mixture of surfactants is used for demulsifying water and petroleum emulsions.

Preferably, the surfactant is selected from the surfactants used as demulsifiers of water and petroleum emulsions.

Preferably, the demulsification process according to the invention is a demulsification process of a water-in-petroleum emulsion.

Advantageously, the surfactant has a hydrophilic-lipophilic balance (HLB) greater than 6, more preferentially greater than 8.

Preferably, the surfactant is selected from the group constituted by the polymers and copolymers of ethylene oxide and/or of propylene oxide; the polyglycerol esters; the sorbitan esters; the amines, such as hexylamine or octylamine; the alkoxylated compounds such as the ethoxylated phenols, the ethoxylated alcohols, the alkoxylated sorbitan esters, and the ethoxylated amines; and mixtures thereof.

More preferentially, the surfactant is selected from the alkoxylated compounds such as the ethoxylated phenols, the ethoxylated alcohols, the alkoxylated sorbitan esters, and the ethoxylated amines; the polyglycerol esters; and mixtures thereof.

Alternatively, the surfactant is selected from the polymers and copolymers of ethylene oxide and/or of propylene oxide.

Preferably, the total quantity of surfactant(s) other than a MEL, is comprised between 1 ppm and 10000 ppm, more preferentially between 5 ppm and 1000 ppm, even more preferentially, between 10 ppm and 200 ppm, with respect to the weight of the emulsion.

By "total quantity of surfactant(s) other than a MEL", is meant the quantity of molecules of surfactant(s) other than a MEL, present in said emulsion.

A particularly advantageous demulsification process according to the invention, relates to a water-in-petroleum emulsion, the volume of petroleum representing between 30% and 60%, preferentially between 40% and 60%, of the total volume of the emulsion, and comprises bringing a demulsifier into contact with the emulsion, the demulsifier comprising at least one mannosylerythritol lipid, preferentially a mixture of MEL(s), more preferentially a crude fermentation medium, and a surfactant other than a MEL.

The at least one MEL and the surfactant other than a MEL, can be brought into contact with the emulsion concomitantly or one after the other.

When the demulsifier comprises several constituents, it can be prepared beforehand before it is brought into contact with the emulsion or prepared in situ, in the emulsion.

The at least one MEL and/or the surfactant other than a MEL can be dispersed in water and/or in an organic solvent, prior to their being brought into contact with the emulsion. The ratio by weight, total quantity of MEL(s)/total quantity of surfactant(s) other than a MEL, varies between 1/99 and 99/1, preferentially between 10/90 and 90/10.

A demulsification process according to the invention comprises, as well as bringing the demulsifier into contact with the emulsion:
separating the petroleum and the water; and
recovering the petroleum.

During the process, the emulsion can be heated in order to improve the water and petroleum separation, preferably between 40° and 90° C., more preferentially between 50° and 80° C., at atmospheric pressure.

The invention also relates to the use of a mannosylerythritol lipid as demulsifier.

Advantageously, the use according to the invention implements at least two MELs, of different classes, selected from the group constituted by the MELs-A, the MELs-B, the MELs-C and the MELs-D.

According to a first advantageous embodiment of the use according to the invention, the use implements MEL(s)-A, MEL(s)-B, MEL(s)-C and optionally MEL(s)-D, even more preferentially MEL(s)-A, MEL(s)-B, MEL(s)-C and MEL(s)-D.

Preferably, the use implements MEL(s)-A and MEL(s)-B at a content comprised between 50% to 90% by weight, preferably 60% to 85% by weight, the percentages by weight being indicated with respect to the weight of the total quantity of MELs.

Preferably, the use implements MEL(s)-C at a content greater than 5% by weight, preferentially greater than 10% by weight, the percentages by weight being indicated with respect to the weight of the total quantity of MELs.

More particularly, the use implements MEL(s)-A and MEL(s)-B at a content comprised between 60% and 80% by weight and MEL(s)-C at a content greater than or equal to 20% by weight, the percentages by weight being indicated with respect to the weight of the total quantity of MELs.

According to a second advantageous embodiment of the use according to the invention, the use implements MEL(s)-D at a content comprised between 75% and 100% by weight, preferably between 90% and 100% by weight, the percentages by weight being indicated with respect to the weight of the total quantity of MELs.

Advantageously, the MEL is in the form of a mixture of MEL(s). This is then at least one MEL, at least one fatty acid and/or at least one triglyceride, and optionally a strain, which are used as demulsifier. The mixture of MEL(s) has the features as described above.

Preferably, in the use according to the invention, whatever the embodiment, a crude fermentation medium is used as demulsifier.

Preferably, the MEL is used as a demulsifier of a water and petroleum emulsion, more preferentially, of a water-in-petroleum emulsion.

The invention will be better understood in light of the examples which follow, given by way of illustration.

EXAMPLE 1: PREPARATION OF MIXTURES OF MELS, OF A COMPOSITION ACCORDING TO THE INVENTION AND DEMULSIFICATION a) Obtaining MELs The MELs were obtained by a fermentation process comprising the following steps:
conversion of a carbon-containing substrate such as a vegetable (rapeseed) oil by a yeast strain such as *Pseudozyma aphidis* in order to obtain the MELs; and
separating the MELs thus obtained.

The step of separating the MELs was carried out by filtration, centrifugation and evaporation.

At the end of the step of separating the MELs, a first mixture comprising MELs (mixture of MELs 1A) is obtained, which has the following features:
Content of MELs: 55% by weight
Content of other components: 45% by weight (including 42% by weight of fatty acids and triglycerides and 3% by weight of water and strain),
the percentages by weight being given with respect to the total weight of the mixture obtained.

An additional separation step applied to the mixture of MELs 1A was then carried out by adsorption chromatography on a silica column. A second mixture of MELs (mixture of MELs 1B) was thus obtained, which has the following features:
Content of MELs: >98% by weight
Content of other components: <2% by weight (including fatty acids and triglycerides).

The composition of the MELs in the mixture of MELs 1B was analysed by high performance liquid chromatography (HPLC).

For this analysis, 50 mg of the mixture of MELs were weighed and 3 mL of chloroform acidified to 0.2% with formic acid (80%) were added. Once the mixture of MELs has dissolved, the solution is filtered on a 0.2 μm filter or on 3 filters with a diameter of 0.45 μm. 50 μL of clear filtrate is taken, to which 950 μL of acidified chloroform is added in a 2 mL analytical vial. 10 μL of this solution is injected into a Shimadzu LC-20 AD HPLC system provided with an ELSD Sedex 90 detector, equipped with a Nova-Pak silica column 60A, 150×3.9 mm 4 μm and a Nova-Pak silica pre-column 60A, 20×3.9 mm 4 μm. The analysis temperature is 30° C.

The MELs comprise MELs-A (52% by weight), MELs-B (12% by weight), MELs-C (35% by weight), and MELs-D (1% by weight), the percentages by weight being given with respect to the weight of the total quantity of MELs.

b) Preparation of a Composition According to the Invention and Demulsification Process For this example, a French petroleum was used.

The water content is 25%, determined with a Karl Fisher reagent according to the method ASTM D1744-92.

EXAMPLE 2: EFFECT OF MEL ON A WATER-IN-PETROLEUM EMULSION AFTER SETTLING FOR 1 HOUR

The objective of this example is to show the effect of MEL on emulsions of water in different petroleums, with different water/petroleum ratios, as well as the effect of the quantity of MEL introduced into the emulsion.

a) Products Used

The products which were used in this example are the following:
the mixtures of MELs 1A and 1B prepared in Example 1
the petroleums:
"extra-light, sweet, paraffinic" Pennsylvania petroleum
"medium-heavy sour" Alaska petroleum (North Slope Prudhoe Bay) Parisian Basin petroleum
"sour" Texas petroleum
"sweet" North Dakota petroleum
demineralized water.

The Table 1 below shows the values of the features of the petroleums used in Example 2.

TABLE 1

Features of the petroleums used in Example 2

| | Petroleum | | | | |
|---|---|---|---|---|---|
| | Extra-light sweet paraffinic Crude Oil | Medium-heavy, Sour Alaska Crude Oil | PETROREP Crude Oil | Texas Unrefined Crude Oil | North Dakota Unrefined Crude Oil |
| Supplier | ONTA | ONTA | PETROREP | JANULUS | JANULUS |
| Origin | Pennsylvania | Alaska North Slope Prudhoe Bay | Parisian basin | Texas | North Dakota |
| Colour | Brown green | Jet black | Dark brown | Yellow brown/ green black | Yellow brown |
| API density (°) | 43.2 | 26.8 | 36 | 39.6 | 40-43 |
| Dynamic viscosity at 20° C. (mPa · s) | 3.06 | 32.86 | 30.75 | 25.74 | 2.13 |
| Acid value (mg KOH/g) | 0.344 | 2.22 | 0.18 | 0.04 | 0.06 |
| Contents of: | | | | | |
| Sulphur (mg/kg) | 650 | 10400 | 1860 | 16400 | 500 |
| Nitrogen (mg/kg) | <40 | 100 | 860 | 1000 | 160 |
| Asphaltenes (% by weight) | 41.4 | 6.4 | 32.9 | 28.9 | 49.6 |
| Paraffins (% by weight) | 44.0 | 62.7 | 37.9 | 30.0 | 36.7 |
| Polar compounds (% by weight) | 1.0 | 11.4 | 4.6 | 5.2 | 0.8 |
| Aromatics (% by weight) | 13.6 | 19.5 | 24.6 | 35.9 | 12.9 |

In the present application, unless stated otherwise, when a standard is indicated it is the one in force at the filing date.

Its dynamic viscosity at 25° C. is 50 mPa·s, determined using a Stabinger SVM 300/G2 viscometer from Antor Parr according to the standard ASTM D 7042-04 of 2004.

Its content of asphaltenes is 0.8% by weight, measured according to the standard ASTM D2007-03 of 2008.

100 ppm of a mixture of MELs 1A is added to 100 mL of this petroleum. The mixture is stirred for 5 minutes at 500 revolutions per minute (rpm) then introduced into a 100 mL graduated cylinder.

After 1 hour at ambient temperature, a separation of the aqueous and oil phases is observed and 21 mL of water are recovered.

The API densities are given by the supplier with the corresponding petroleums.

The dynamic viscosities were determined using a Stabinger SVM 300/G2 viscometer from Anton Paar according to the standard ASTM D 7042-04 of 2004.

The acid values were determined according to the standard NF EN ISO 660 of September 2009.

The sulphur contents were determined according to the standard ASTM 5453 of 2012.

The nitrogen contents were measured according to the standard ASTM D5762 of January 2012.

The contents of asphaltenes, paraffins, polar compounds and aromatics, were measured according to the standard ASTM D2007-03 of 2008.

b) Process for the Preparation of Different Emulsions

A certain quantity of a mixture of MELs is introduced into 100 mL of demineralized water and the whole is stirred until the solution is homogeneous. The quantity of the mixture of MELs is adjusted according to the content of MELs desired in the emulsion.

According to the desired water/petroleum ratio, the required quantities of demineralized water containing the MELs (from 80 to 20 mL) and of petroleum (from 20 to 80 mL respectively) were introduced into a container, and the mixture was stirred with an Ultra-Turrax type homogenizer at 11,600 rpm for 2 minutes. Each emulsion obtained was poured into a 100 mL graduated cylinder in order to monitor the separation of the petroleum and water at ambient temperature.

c) Results of Demulsification with Petroleum Originating from the Parisian Basin The emulsions were prepared according to the protocol described above with petroleum from the Parisian basin and according to the quantities indicated in Tables 2 to 4 hereafter.

Reading the volumes of water is carried out after settling for 1 hour at ambient temperature. The percentages of water recovered correspond to the volumes of water read on the graduated cylinder relative to the volumes of aqueous solutions introduced. The tests are carried out in triplicate.

| | Quantity of the mixture of MELs 1B in the water-in-petroleum emulsion = 80/20 | | | |
|---|---|---|---|---|
| | 0 | 80 ppm | 40 ppm | 8 ppm | 0.8 ppm |
| % of water recovered | 0 | >98 | >98 | >98 | >70 |

| | Quantity of the mixture of MELs 1A in the water-in-petroleum emulsion = 80/20 | | |
|---|---|---|---|
| | 0 | 80 ppm | 16 ppm |
| % of water recovered | 0 | >80 | >80 |

| | Quantity of the mixture of MELs 1A in the water-in-petroleum emulsion = 50/50 | | |
|---|---|---|---|
| | 0 | 50 ppm | 10 ppm |
| % of water recovered | 0 | >70 | >70 |

Tables 2 to 4: Results of Demulsification of Water-Petroleum Emulsion from the Parisian Basin The tests were reproduced using sea water. The separations of the water and the petroleum were obtained more rapidly, in 30 minutes at ambient temperature.

d) Results of Demulsification with Petroleum Originating from the Parisian Basin, Pa., Alaska and Texas The water-in-petroleum emulsions of this example were prepared according to the protocol described in Example 2 b) with petroleums originating from the Parisian basin, Pennsylvania, Ak. and Texas and according to the quantities indicated in Table 5.

The volumes of water are read after settling for 1 hour at ambient temperature. The percentages of water recovered correspond to the volumes of water read on the graduated cylinder relative to the volumes of aqueous solutions introduced. The tests are carried out in triplicate.

TABLE 5

Results of demulsification of water-petroleum emulsion of various origins

| | Water-in-petroleum emulsion (50/50) | | | | | | | |
|---|---|---|---|---|---|---|---|---|
| | Parisian | | Pennsylvania | | Alaska | | Texas | |
| water recovered (%) without the addition of demulsifier | <55 | | <15 | | <85 | | <75 | |
| Quantity of the mixture of MELs 1B in the emulsion (ppm) | 5 | 25 | 5 | 25 | 5 | 25 | 5 | 25 |
| water recovered (%) | >50 | >80 | >98 | >90 | >95 | >90 | >80 | >80 | d) Results of Demulsification with Petroleum Originating from Dakota

The water-in-petroleum emulsions of this example were prepared according to the protocol described in Example 2 b) with petroleum originating from Dakota and according to the quantities indicated in Table 6.

The volumes of water were read after settling for 1 hour at ambient temperature. The percentages of water recovered correspond to the volumes of water read on the graduated cylinder relative to the volumes of aqueous solutions introduced. The tests are carried out in triplicate.

TABLE 6

Results of demulsification of water-petroleum emulsion from Dakota

| | Water-in-petroleum emulsion (20/80) Dakota | |
|---|---|---|
| Quantity of the mixture of MELs 1B in the emulsion (ppm) | 2 | 10 |
| water recovered (%) | >98 | >98 |

Without MEL, similar results are obtained at the end of 20 hours.

EXAMPLE 3: EFFECT OF A DEMULSIFIER COMPRISING A MEL AND ANOTHER SURFACTANT ON A WATER-IN-PETROLEUM EMULSION a) Products Used The products which were used in this Example are the following:
  the mixture of MELs 1B prepared in Example 1,
  the surfactant other than a MEL: nonylphenol polyethylene glycol ether, (Tergitol NP-11 marketed by Dow Chemical),
  demineralized water,
  "sour" Texas petroleum.

b) Process for the Preparation of the Emulsions

The protocol is identical to that described in Example 2 b). For this example, three aqueous solutions were necessary, one containing the mixture of MELs 1B, another containing the surfactant other than a MEL and another containing the mixture of MELs 1B with the surfactant other than a MEL, this surfactant being indicated above.

Two readings of the volumes of water were carried out, one after settling for 1 hour and the other after settling for 20 hours at ambient temperature. The percentages of water recovered correspond to the volumes of water read on the graduated cylinder relative to the volumes of aqueous solutions introduced. The tests are carried out in triplicate.

c) Results: % of Water Recovered

TABLE 7

| Result of comparative test | | |
|---|---|---|
| | Water-in-petroleum emulsion (50/50) water recovered (%) | |
| Settling time | 1 h | 20 h |
| +0 ppm of MEL +50 ppm of nonylphenol polyethylene glycol ether | <85% | <85% |
| +25 ppm of MELs +25 ppm of nonylphenol polyethylene glycol ether | >90% | >90% |
| +50 ppm of MELs +0 ppm of nonylphenol polyethylene glycol ether | <85% | <85% |

By way of indication, starting from a water-in-Texas petroleum emulsion (50/50) without demulsifier, less than 75% of water is recovered after settling for 1 hour at ambient temperature and less than 80% of water is recovered after 20 hours. The presence of MEL improves the demulsification observed with the use of a single surfactant other than a MEL.

EXAMPLE 4: COMPARATIVE EXAMPLE

The water-in-petroleum emulsion in this example was prepared according to the protocol described in Example 2 b) with petroleum originating from Alaska and according to the quantities indicated in Table 8.

The volume of water is read after 1 hour at ambient temperature. The percentage of water recovered corresponds to the volume of water read on the graduated cylinder relative to the volume of aqueous solution introduced. The tests are carried out in triplicate.

TABLE 8

| Result of non-demulsification of water-in-Alaska petroleum emulsion | |
|---|---|
| | Water-in-petroleum emulsion (50/50) Alaska |
| Quantity of the mixture of MELs 1B in the emulsion (ppm) | 250 |
| water recovered (%) | 0 |

The addition of too large a quantity of MEL has the effect of stabilizing the emulsion. No separation between the petroleum and water is observed.

The invention claimed is:

1. A process for demulsification of a water and petroleum emulsion comprising contacting the emulsion with a demulsifier comprising at least one mannosylerythritol lipid, wherein the total quantity of mannosylerythritol lipid(s) is comprised between 0.5 ppm and 100 ppm, with respect to the weight of the emulsion.

2. The process according to claim 1, in which the quantity of petroleum is comprised between 15 and 80% by volume with respect to the volume of the emulsion.

3. The process according to claim 2, in which the demulsifier further comprises at least one triglyceride and/or at least one fatty acid.

4. The process according to claim 2, in which the demulsifier further comprises a surfactant other than a mannosylerythritol lipid.

5. The process according to claim 1, in which the demulsifier further comprises at least one triglyceride and/or at least one fatty acid.

6. The process according to claim 5, in which the demulsifier further comprises a surfactant other than a mannosylerythritol lipid.

7. The process according to claim 1, in which the demulsifier further comprises a surfactant other than a mannosylerythritol lipid.

* * * * *